United States Patent
Watabe

(10) Patent No.: US 7,403,105 B2
(45) Date of Patent: Jul. 22, 2008

(54) HIGHLY RELIABLE DIRECT-TYPE TIRE INFLATION PRESSURE SENSING APPARATUS

(75) Inventor: Nobuya Watabe, Nagoya (JP)

(73) Assignee: DENSO CORPORATION, Kariya (JP)

( * ) Notice: Subject to any disclaimer, the term of this patent is extended or adjusted under 35 U.S.C. 154(b) by 382 days.

(21) Appl. No.: 11/159,419

(22) Filed: Jun. 23, 2005

(65) Prior Publication Data
US 2005/0285727 A1 Dec. 29, 2005

(30) Foreign Application Priority Data
Jun. 24, 2004 (JP) .............................. 2004-186043

(51) Int. Cl.
*B60C 23/00* (2006.01)
(52) U.S. Cl. ...................... 340/447; 340/442; 73/146.2
(58) Field of Classification Search ................ 340/447, 340/442, 448; 73/146.2–146.5
See application file for complete search history.

(56) References Cited

U.S. PATENT DOCUMENTS

| 6,591,671 | B2 | 7/2003 | Brown |
| 6,894,600 | B2 * | 5/2005 | Phelan ..................... 340/10.34 |
| 7,271,710 | B2 * | 9/2007 | Saitou et al. ................. 340/447 |
| 2002/0003474 | A1 * | 1/2002 | McClelland et al. ......... 340/442 |
| 2004/0135681 | A1 * | 7/2004 | Tsujita ....................... 340/442 |
| 2004/0246117 | A1 | 12/2004 | Ogawa et al. ............... 340/445 |

FOREIGN PATENT DOCUMENTS

| JP | A-2002-324292 | 11/2002 |
| JP | 2004-359119 | 12/2004 |

OTHER PUBLICATIONS

Office Communication issued from Japanese Patent Office dated Apr. 1, 2008 for related Japanese application No. 2004-186043 (a copy of English translation enclosed.).

* cited by examiner

*Primary Examiner*—Phung T Nguyen
(74) *Attorney, Agent, or Firm*—Posz Law Group, PLC

(57) ABSTRACT

A tire inflation pressure sensing apparatus includes a pressure sensor, a transmitter, a transceiver, a receiver, and a determining device. The pressure sensor and transceiver are provided on a wheel of a vehicle, while the transmitter, receiver, and determining device are provided on the body of the vehicle. The pressure sensor works to generate a pressure signal representative of the inflation pressure of a tire on the wheel. The transmitter works to send out a predetermined radio wave. The transceiver is configured to receive the predetermined radio wave and send out the pressure signal when a transmission of the pressure signal is required and a level of the received predetermined radio wave has reached a predetermined level. The receiver works to receive the pressure signal from the transceiver. The determining device is configured to determine the inflation pressure of the tire based on the pressure signal received via the receiver.

19 Claims, 12 Drawing Sheets

HIGHLY RELIABLE DIRECT-TYPE TIRE INFLATION PRESSURE SENSING APPARATUS

CROSS-REFERENCE TO RELATED APPLICATION

This application claims priority from Japanese Patent Application No. 2004-186043, filed on Jun. 24, 2004, the content of which is hereby incorporated by reference into this application.

BACKGROUND OF THE INVENTION

1. Technical Field of the Invention

The present invention relates generally to tire condition monitoring apparatuses or systems.

More particularly, the invention relates to a direct-type tire inflation pressure sensing apparatus that includes a transceiver provided on a wheel of a vehicle, a receiver provided on the body of the vehicle, and a transmitter provided on the body of the vehicle for determining the position of the transceiver relative to the receiver so as to ensure reliable transmission of a tire inflation pressure signal from the transceiver to the receiver.

2. Description of the Related Art

Conventional direct-type tire inflation pressure sensing apparatuses generally include a transmitter and a receiver.

The transmitter is directly installed to a wheel of a vehicle and includes a pressure sensor working to sense an inflation pressure of a tire mounted on the wheel. The transmitter is configured to send out a pressure signal representative of the inflation pressure of the tire sensed by the pressure sensor.

The receiver is installed to the body of the vehicle and includes an antenna. The receiver is configured to receive the pressure signal from the transmitter through the antenna and determine the inflation pressure of the tire based on the received pressure signal.

Specifically, with reference to FIG. 13, the transmitter J2 is placed inside the tire J1 and attached to an air valve J4 of the wheel J3. Consequently, when the vehicle is running, the position of the transmitter J2 relative to the antenna of the receiver varies due to rotation of the transmitter J2 with the tire J1, thus resulting in variation in the level of the pressure signal received by the receiver.

There may exist such a position of the transmitter J2 relative to the antenna of the receiver where the level of the pressure signal received by the receiver is lower than a necessary level. When the transmitter J2 is rotated to this position and sends out the pressure signal representative of the inflation pressure of the tire J1, the receiver cannot accurately recognize or identify the pressure signal, thus resulting in a decrease in the fidelity of the receiver.

To avoid such a decrease in the fidelity of the receiver, one may consider applying one of the following two conventional approaches.

The first approach is to determine a suitable installation position of the antenna of the receiver on the body of the vehicle such that the receiver can accurately recognize the pressure signal sent out by the transmitter J2 at any angular positions.

However, determination of such an installation position of the antenna requires an additional task of evaluating the level of the pressure signal received by the receiver.

Moreover, since the pressure signal sent out from the transmitter J2 will be attenuated during the course of transmission to the receiver, it is, indeed, very difficult to determine such an installation position of the antenna.

For example, when the transmitter J2 sends out the pressure signal at a position where the transmitter J2 is opposed to the receiver with the wheel J3 positioned therebetween, the pressure signal cannot pass through the wheel J3 that is generally made of a metal material.

Especially, when the maximum level of the pressure signal sent out by the transmitter J2 is restricted under regulations, determination of such an installation position of the antenna becomes more difficult.

Furthermore, in the case that the receiver has only a single antenna, through which the receiver receives all the pressure signals sent out from a plurality of transmitters J2 installed to different wheels J3 of the vehicle, it is required to install the antenna at an optimal position where the receiver can accurately recognize all the pressure signals sent out from different transmitters J2. However, determination of the optimal position is even more difficult, and a lot of time is required to evaluate the level of all the pressure signals received by the receiver.

The second approach is to allow the transmitter J2 to consecutively send out a plurality of frames, which contain the same pressure signal representative of an inflation pressure of the tire, so as to increase the probability of accurate recognition of the pressure signal by the receiver.

However, this approach still cannot certainly ensure accurate recognition of the pressure signal by the receiver.

Moreover, since a plurality of frames are sent out for transmission of a single pressure signal, the electrical power consumed by the transmitter J2 is increased. As a result, when the transmitter J2 is supplied with electrical power by a battery, the life of the battery will be shortened.

SUMMARY OF THE INVENTION

The present invention has been made in view of the above-mentioned problems.

It is, therefore, the first object of the present invention to provide a tire inflation pressure sensing apparatus that has an improved configuration ensuring accurate recognition of a pressure signal sent out from a transmitter of the sensing apparatus by a receiver of the same regardless of rotation of the transmitter.

It is the second object of the present invention to provide increased flexibility in determining a suitable installation position of an antenna of the receiver on the body of a vehicle, while ensuring that the receiver can accurately recognize the pressure signal received through the antenna.

It is the third object of the present invention to ensure that the receiver can accurately recognize the pressure signal sent out from the transmitter without transmission of more than one frame that contains the same pressure signal.

According to a first aspect of the present invention, a tire inflation pressure sensing apparatus is provided which includes a pressure sensor, a transmitter, a transceiver, a receiver, and a determining device.

The pressure sensor is provided on a wheel of a vehicle. The pressure sensor works to sense an inflation pressure of a tire mounted on the wheel and generate a pressure signal representative of the sensed inflation pressure of the tire.

The transmitter is provided on a body of the vehicle. The transmitter is configured to send out a predetermined radio wave.

The transceiver is provided on the wheel of the vehicle. The transceiver is configured to receive the predetermined radio wave sent out from the transmitter and send out the pressure signal generated by the pressure sensor when a transmission of the pressure signal is required and a level of the received predetermined radio wave has reached a predetermined level.

The receiver is provided on the body of the vehicle. The receiver is configured to receive the pressure signal sent out from the transceiver.

The determining device is provided on the body of the vehicle. The determining device is configured to determine the inflation pressure of the tire based on the pressure signal received via the receiver.

According to a second aspect of the present invention, in the tire inflation pressure sensing apparatus, the transceiver is configured to send out the pressure signal generated by the pressure sensor when a transmission of the pressure signal is required and a voltage of the received predetermined radio wave has increased above a predetermined value.

According to a third aspect of the present invention, in the tire inflation pressure sensing apparatus, the transceiver is configured to send out the pressure signal generated by the pressure sensor when a transmission of the pressure signal is required and a voltage of the received predetermined radio wave has reached a maximum value.

According to a fourth aspect of the present invention, in the tire inflation pressure sensing apparatus, the pressure sensor and the transceiver are supplied with electrical power via the predetermined radio wave.

Preferably, the tire inflation pressure sensing apparatus further comprises a charging unit that is provided on the wheel of the vehicle and configured to store therein an electrical power, which is induced by the predetermined radio wave received via the transceiver, and supply the electrical power to the pressure sensor and the transceiver. The transceiver is preferably configured to send out the pressure signal generated by the pressure sensor when a transmission of the pressure signal is required, the level of the received predetermined radio wave has reached the predetermined level, and a voltage across the charging unit has increased above a predetermined value.

Moreover, it is preferable that the predetermined radio wave and the pressure signal are sent at different frequencies within a same low frequency band.

According to a fifth aspect of the present invention, in the tire inflation pressure sensing apparatus, the transceiver is configured to store the pressure signal generated by the pressure sensor in a frame that consists of a plurality of packets and send out those packets separately at different times when a transmission of the pressure signal is required and the level of the received predetermined radio wave has reached the predetermined level.

According to a sixth aspect of the present invention, in the tire inflation pressure sensing apparatus, the transmitter and the receiver are integrated into a transceiver that is configured to send out the predetermined radio wave and receive the pressure signal sent out from the transceiver.

With the above-described configuration, it is possible to determine a suitable installation position of the receiver on the body of the vehicle with more flexibility and less time effort.

Further, with the increased flexibility, it becomes possible to install the receiver at an optimal position on the body of the vehicle, so that the receiver has the highest sensitivity to the pressure signal sent out from the transceiver.

As a result, the receiver can accurately recognize the pressure signal sent out from the transceiver, regardless of rotation of the transceiver together with wheel.

Furthermore, the receiver can accurately recognize the pressure signal sent out from the transceiver without transmission of more than one frame that contain the same pressure signal, thus saving the electrical power consumed by the transceiver.

BRIEF DESCRIPTION OF THE DRAWINGS

The present invention will be understood more fully from the detailed description given hereinafter and from the accompanying drawings of the preferred embodiments of the invention, which, however, should not be taken to limit the invention to the specific embodiments but are for the purpose of explanation and understanding only.

In the accompanying drawings.

DESCRIPTION OF THE PREFERRED EMBODIMENTS

The preferred embodiments of the present invention will be described hereinafter with reference to FIGS. 1-12.

It should be noted that, for the sake of clarity and understanding, identical components having identical functions in

First Embodiment

Figure 1:
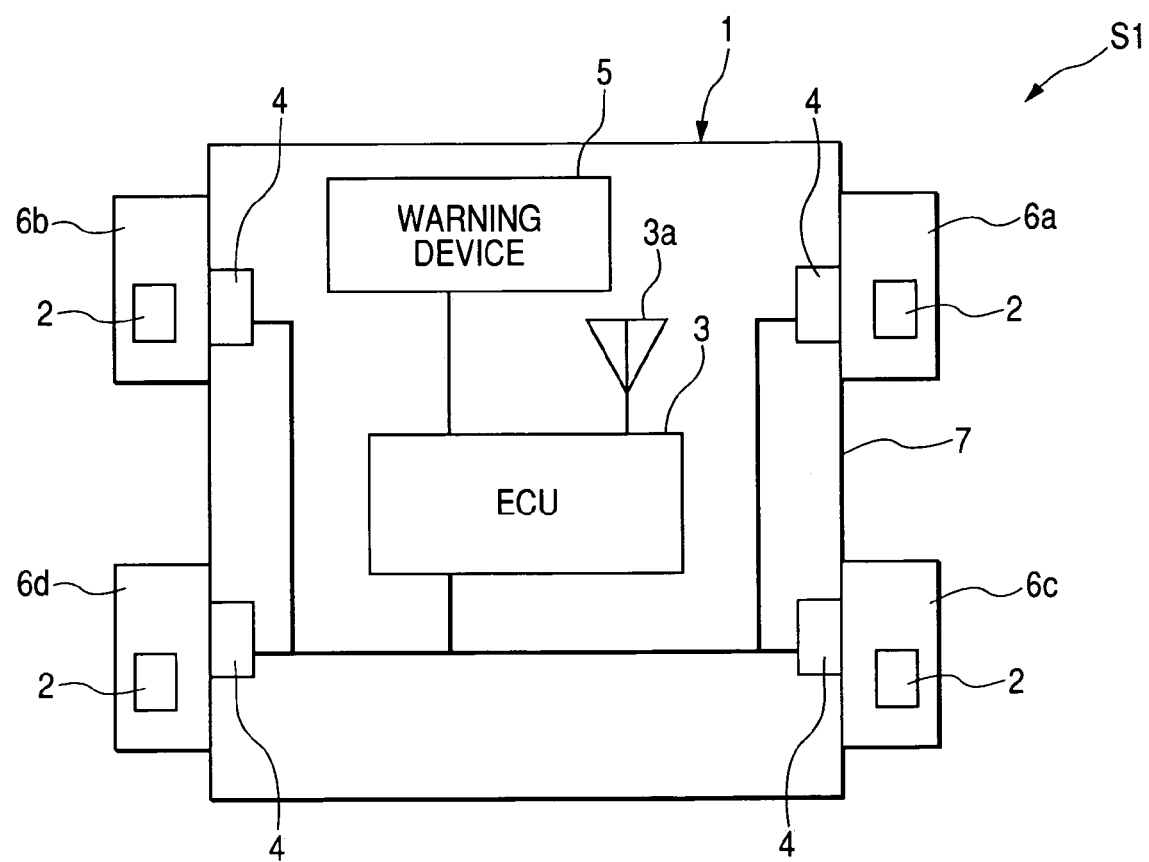
FIG. 1 is a schematic view showing the overall configuration of a tire inflation pressure sensing apparatus according to the first embodiment of the invention.

FIG. 1 shows the overall configuration of a tire inflation pressure sensing apparatus S1 according the first embodiment of the invention.

The tire inflation pressure sensing apparatus S1 is installed to a vehicle 1; it is configured to sense inflation pressures of four tires each of which is mounted on one of four wheels 6a-6d of the vehicle 1 (i.e., the front-right wheel 6a, the front-left wheel 6b, the rear-right wheel 6c, and the rear-left wheel 6d).

As shown in FIG. 1, the tire inflation pressure sensing apparatus S1 includes four transceivers 2, an ECU (Electronic Control Unit) 3, four transmitters 4, and a warning device 5.

Each transceiver 2 is installed to one of the four wheels 6a-6d and configured to sense an inflation pressure of a tire mounted on the corresponding wheel and send out a frame that contains a pressure signal representative of the sensed inflation pressure of the tire.

On the other hand, the ECU 3, four transmitters 4, and warning device 5 are installed to the body 7 of the vehicle 1. The ECU 3 functions as a receiver to receive the frames sent out from the transceivers 2; it also functions as a determining device to determine the inflation pressures of the four tires based on the pressure signals contained in the received frames. The four transmitters 4 are configured to send out a predetermined AC signal. The warning device 5 is electrically connected to the ECU 3.

In the present embodiment, the predetermined AC signal is sent out from the transmitters 4 to the transceivers 2 at a frequency within a low frequency band of 30 to 300 kHz, for example 125 kHz; the frames are sent out from the transceivers 2 to the ECU 3 at a frequency within an ultra high frequency band of 300 to 3000 MHz, for example 315 MHz.

Figure 2:
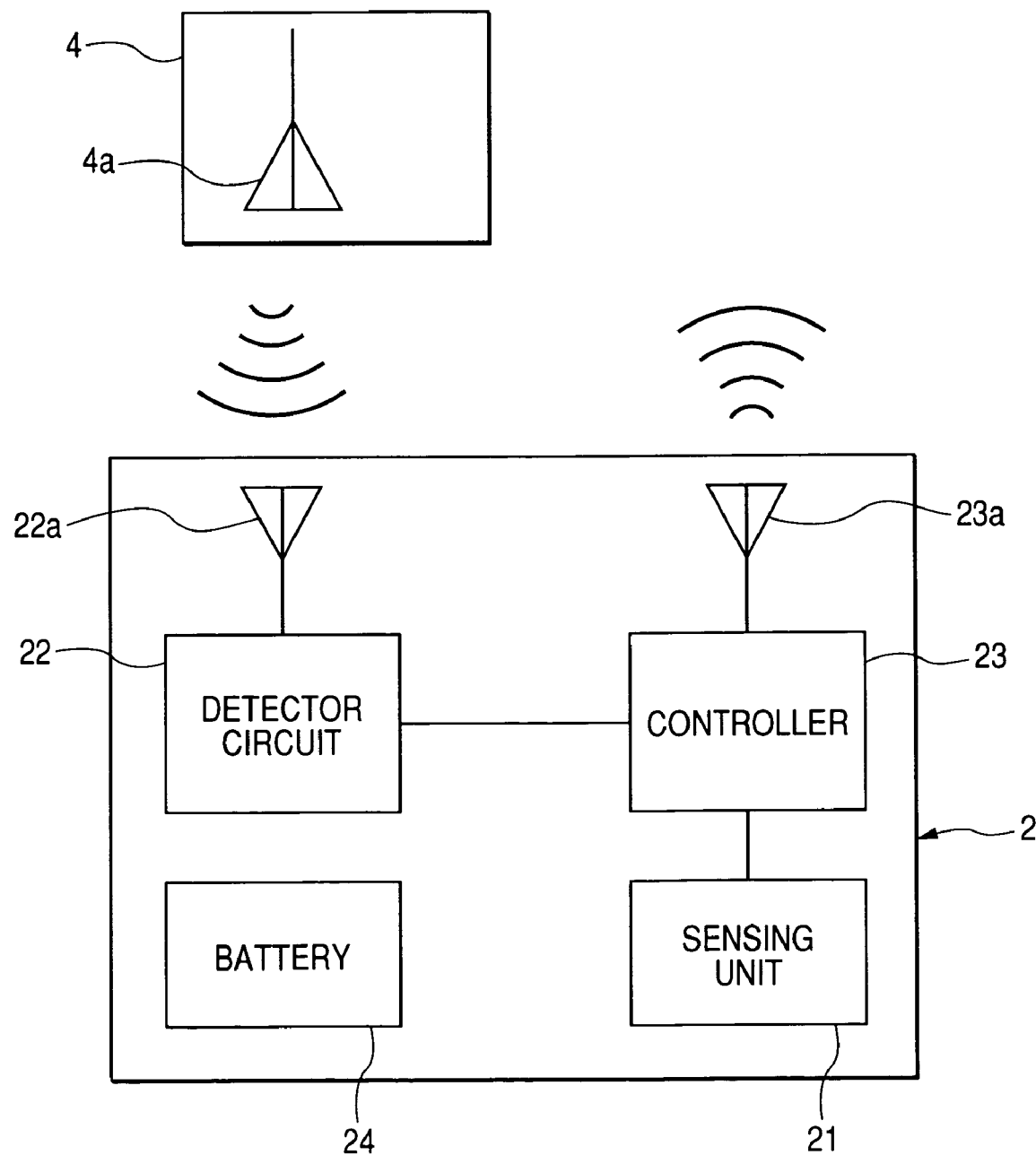
FIG. 2 is a block diagram showing the overall configuration of a transceiver and a transmitter of the tire inflation pressure sensing apparatus of FIG. 1.

FIG. 2 shows the overall configuration of one of the four transceivers 2 and a corresponding one of the four transmitters 4.

As shown in FIG. 2, the transceiver 2 includes a sensing unit 21, a detector circuit 22, a controller 23, and a battery 24.

The sensing unit 21 is configured with sensors, such as a diaphragm-type pressure sensor and a temperature sensor, and works to output signals representative of the sensed inflation pressure of the tire and temperature of air in the tire.

Figure 3:
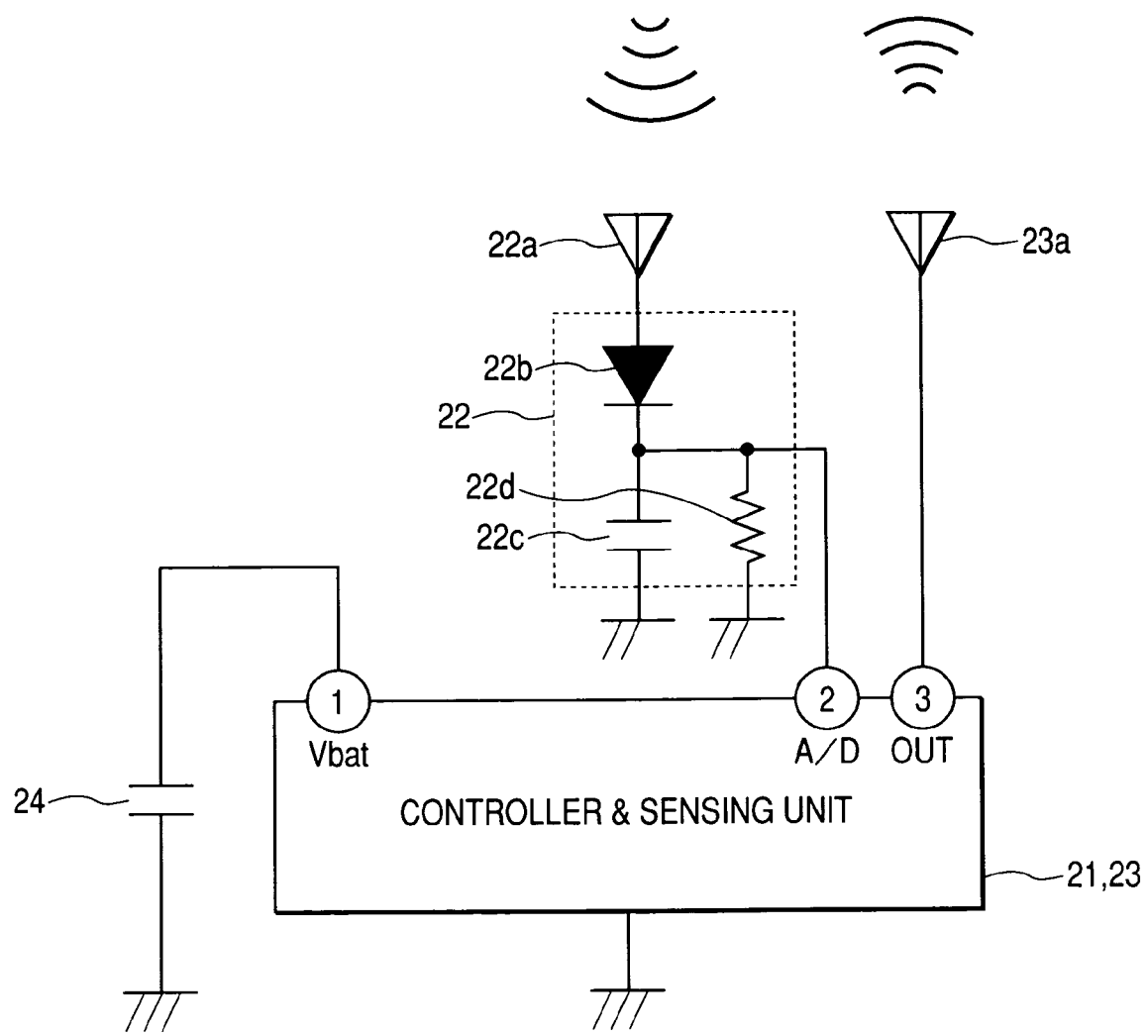
FIG. 3 is a circuit diagram showing the overall configuration of a detector circuit of the transceiver of FIG. 2.

Referring to FIG. 3, the detector circuit 22 is configured with an antenna 22a, a diode 22b, a capacitor 22c, and a resistor 22d.

The detector circuit 22 receives the predetermined AC signal sent out from the corresponding transmitter 4 through the antenna 22a. The received predetermined AC signal is then half-wave rectified through the diode 22b and smoothed through the capacitor 22c, thus being converted to a corresponding DC signal that is to be outputted to the controller 23.

Additionally, since the electrical charge stored in the capacitor 22c is configured to be discharged through the resistor 22d, the responsiveness of the corresponding DC signal to the received predetermined AC signal is increased, thus resulting in a DC output voltage across the capacitor 22c which varies in instantaneous response to a level of the received predetermined AC signal.

The controller 23 is configured with a microcomputer, which is of a well-known type and includes a CPU (Central Processing Unit), a ROM (READ Only Memory), a RAM (Random Access Memory), and I/O (Input/Output) devices. Further, the controller 23 is equipped with an antenna 23a.

The controller 23 has a program installed in the ROM and is configured to implement predetermined processes in accordance with the program.

Specifically, the controller 23 receives signals outputted from the sensing unit 21 and processes those signals. Then, the controller 23 stores in a frame those signals together with an ID signal that is indicative of the corresponding one of the wheels 6a-6d to which the transceiver 2 sending out the frame is installed. After that, the controller 23 determines a transmission time, which is to be described below in detail, and sends out the frame through the antenna 23a at the determined transmission time.

The battery 24 supplies electrical power to the sensing unit 21, detector circuit 22, and controller 23.

As described previously, each transceiver 2 is attached to an air valve of the corresponding one of the wheels 6a-6d and at least the sensing unit 21 thereof is placed inside the tire on the corresponding wheel so as to be exposed to the air in the tire. Referring back to FIG. 2, each transmitter 4 is provided at a position. on the body 7 of the vehicle 1 corresponding to one of the transceivers 2. Specifically, each transmitter 4 is positioned away from the corresponding transceiver 2 by a given distance and fixed to the body 7 of the vehicle 1. Each transmitter 4 includes an antenna 4a and is configured to constantly send out through the antenna 4a the predetermined AC signal (i.e., carrier signal).

Additionally, each transmitter 4 may be configured to operate by itself or be controlled by the ECU 3.

The ECU 3 is configured to receive frames, each of which is sent out from one of the four transceivers 2, and determine the inflation pressures of the four tires based on the signals contained n the received frames.

The ECU 3 is configured with a microcomputer, which is of a well-known type and includes a CPU, a ROM, a RAM, and I/O devices. Further, the ECU 3 is equipped with an antenna 3a.

The ECU 3 has a program installed in the ROM, and is configured to implement predetermined processes in accordance with the program, Specifically, the ECU 3 receives frames sent out from the transceivers 2 through the antenna 3a, and identifies for each of the frames the corresponding wheel, to which the transceiver 2 having sent out the frame is installed, based on the ID signal contained in the frame.

Then, the ECU 3 determines each of the inflation pressures of the four tires through performing signal processing and calculations based on the signals contained in the corresponding one of the frames.

After that, the ECU 3 compares each of the determined inflation pressures of the four tires with a predefined threshold value and outputs a warning signal to the warning device 5 when it is lower than the predefined threshold value.

The warning device 5 is arranged, as shown in FIG. 1, in a place that is visible for the driver of the vehicle 1. The warning device 5 may be configured with at least one of a warning lamp, a warning display, and a warning buzzer; both the warning lamp and warning display may be disposed in the instrument panel of the vehicle 1. The warning device 5 informs the driver of a decrease in the inflation pressure of a tire upon receiving a warning signal outputted from the ECU 3.

Having described the overall configuration of the tire inflation pressure sensing apparatus S1, operation thereof will be described hereinafter with reference to FIGS. 4-7.

Figure 4B:
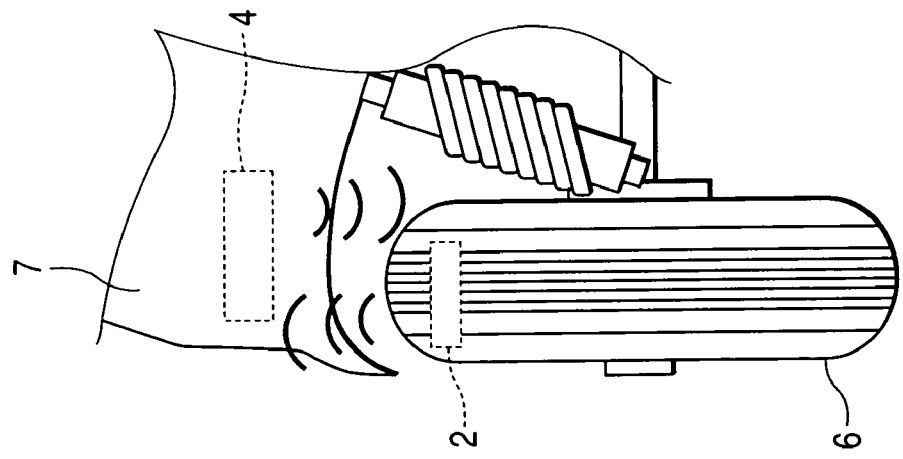
FIGS. 4A-4B are schematic views illustrating the angular position of a transceiver relative to a transmitter in the tire inflation pressure sensing apparatus of FIG. 1.
Figure 4A:
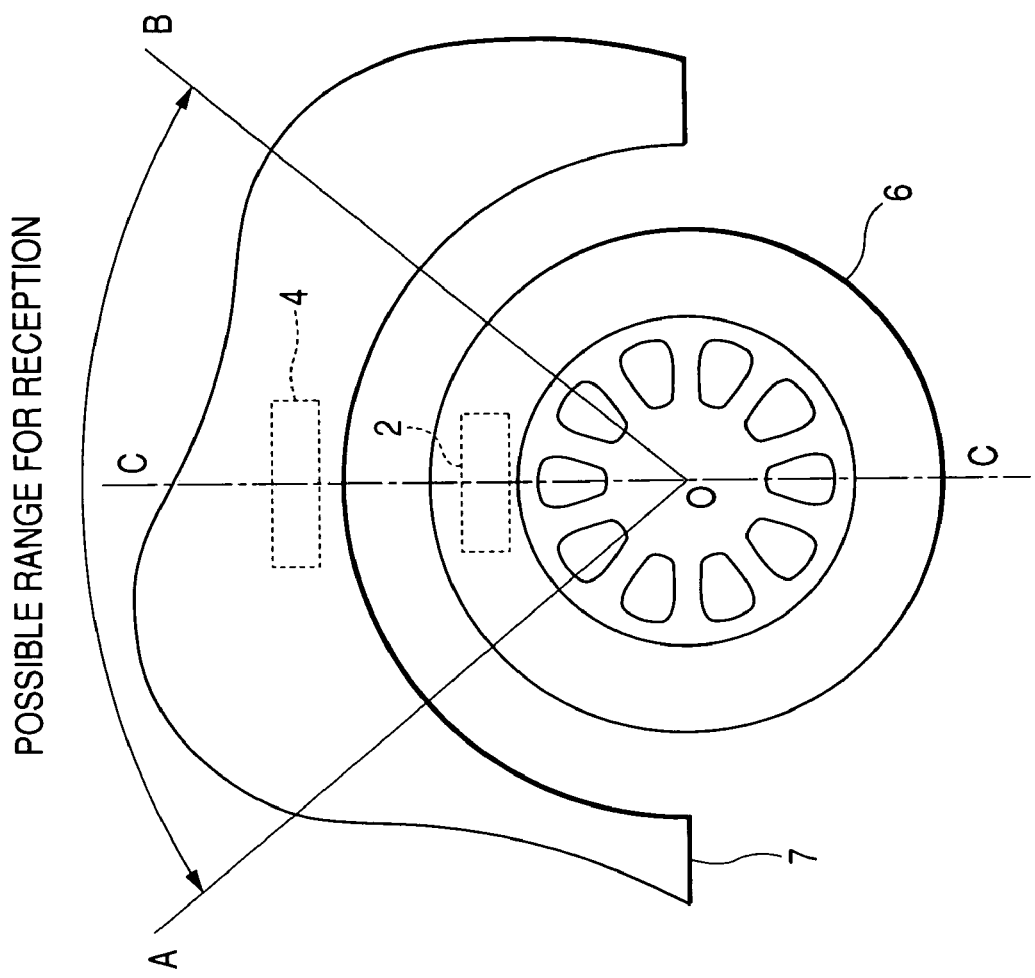

FIGS. 4A-4B illustrate the position of one of the transceivers 2 relative to the corresponding one of the transmitters 4. In the figures, the transmitter 4 is installed to a fender of the vehicle body 7 such that a vertical centerline C—C of the wheel passes through the transmitter 4.

In this case, since the predetermined AC signal is sent out from the transmitter 4 at a frequency within the low frequency band as described previously, the possible range of angular position of the transceiver 2 for reception is limited to an angular range A—O—B of, for example, about 90°. The angular range A—O—B spreads out from the shaft of the wheel and is symmetrical with respect to the vertical centerline C—C.

The possible range of angular position of the transceiver 2 for reception here denotes a range within which the level of the predetermined AC signal received by the transceiver 2 is above a necessary level for accurate recognition of the signal (to be referred to as possible range for reception hereinafter).

Figure 5:
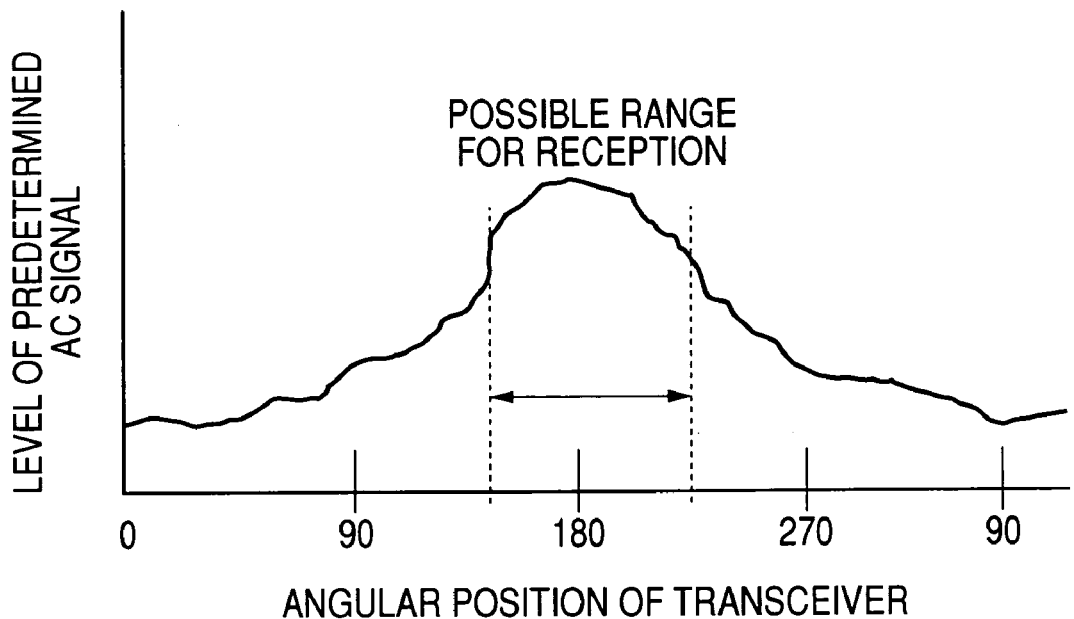
FIG. 5 is a characteristic diagram showing a level of a predetermined AC signal that is sent out from a transmitter and received by a transceiver in the tire inflation pressure sensing apparatus of FIG. 1.

FIG. 5 shows the level of the predetermined AC signal received by the transceiver 2 at different angular positions. As shown in the figure, the level of the predetermined AC signal received by the transceiver 2 varies with the angular position of the transceiver 2.

More specifically, the level of the predetermined AC signal received by the transceiver 2 becomes high when the transceiver 2 rotates into the possible range for reception, and reaches the highest level when the transceiver 2 is positioned on the vertical line C—C, in other words, when the transceiver 2 is positioned closest to the transmitter 4.

As described previously, the predetermined AC signal received by the transceiver 2 is converted to a corresponding DC signal through the detector circuit 22, and then, provided to the controller 23.

Figure 6:
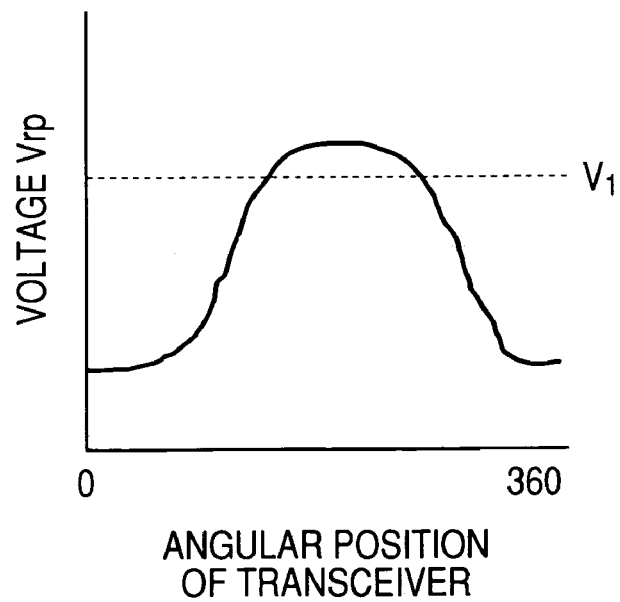
FIG. 6 is a characteristic diagram showing the voltage of a DC signal that is converted from the predetermined AC signal of FIG. 5 through the detector circuit of FIG. 3.

FIG. 6 shows the voltage Vrp of the corresponding DC signal received by the controller 23. As shown in the figure, the voltage Vrp also varies with angular position of the transceiver 2, in response to the varying level of the predetermined AC signal shown in FIG. 5.

Accordingly, with the above configuration, the controller 23 can determine whether the transceiver 2 rotates in the possible range for reception based on the voltage Vrp of the received corresponding DC signal. Specifically, when the voltage Vrp is above a predetermined value V1, the controller 23 determines that the transceiver 2 rotates in the possible range for reception.

In this embodiment, the controller 23 determines a transmission time for sending out the frame from the transceiver 2 to the ECU 3 through checking whether both the following two conditions are satisfied.

The first condition is that the time period from the previous transmission time to the present moment is longer than a given time period, for example, of 1 minute. When this condition is satisfied, the controller 23 recognizes that it is time to start new transmission, in other words, that a new transmission is required.

The second condition is that the voltage Vrp has increased above the predetermined value V1, in other words, the transceiver 2 has rotated into the possible range for reception. Additionally, the predetermined value V1 may be previously stored in the ROM or RAM of the controller 23.

Figure 7:
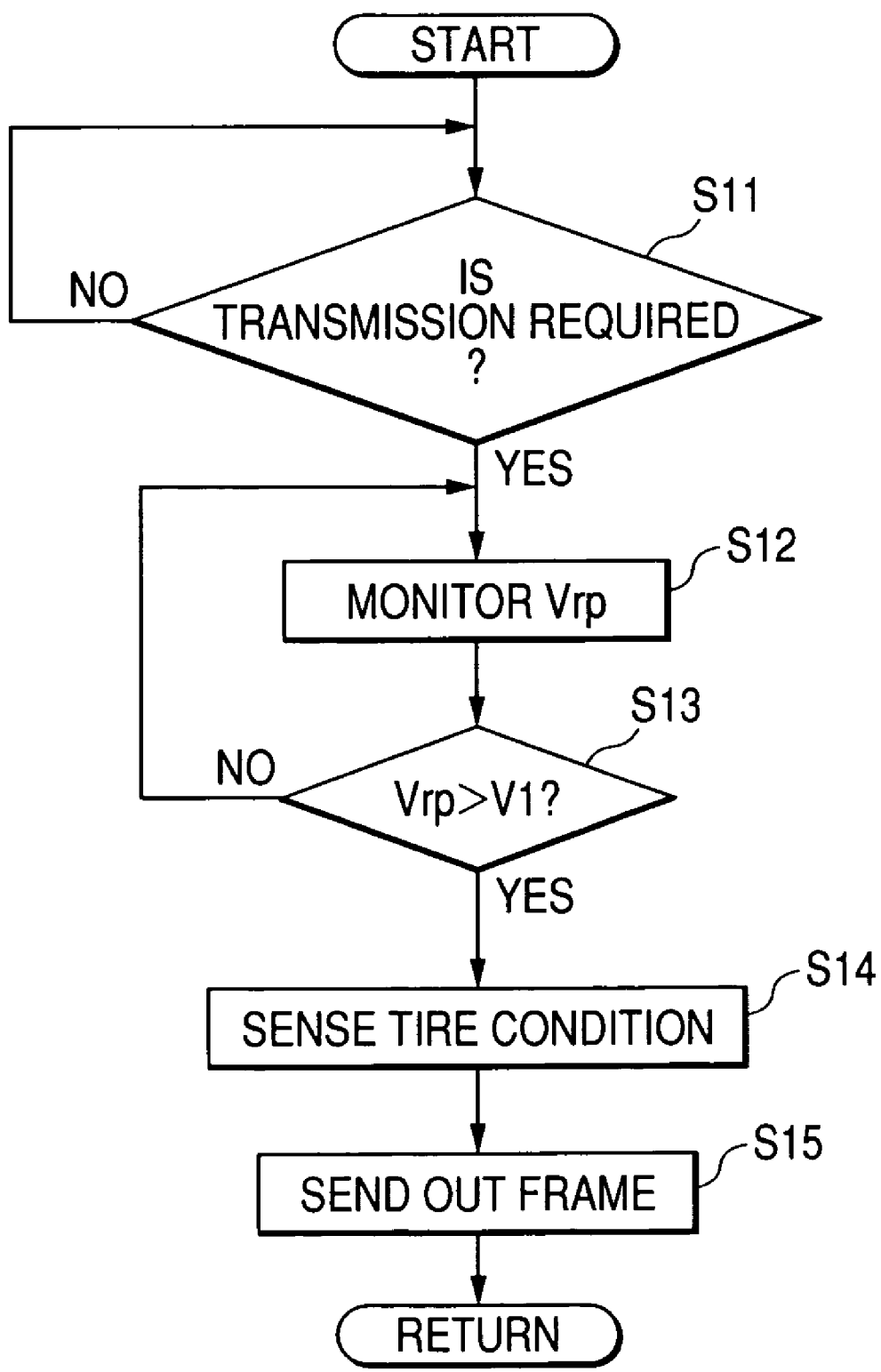
FIG. 7 is a flow chart showing a process performed by the transceiver of FIG. 2 for sending out a frame containing signals.

FIG. 7 shows a process for sending out the frame from the transceiver 2 to the ECU 3 according to the present embodiment, which is performed by the controller 23 of the transceiver 2.

Specifically, at the step S11, a determination is made as to whether a new transmission is required. If it is, the process proceeds to the step S12; else, the process returns to the START thereof.

At the step S12, the voltage Vrp of the corresponding DC signal, which is provided from the detector circuit 22 to the controller 23, is monitored.

At the step S13, another determination is made as to whether the voltage Vrp of the corresponding DC signal has increased above the predetermined value V1. If it has been, the process proceeds to the step S14; else the process returns to the step S12 to repeat monitoring the voltage Vrp.

At the step S14, the inflation pressure of the tire and the temperature of air in the tire are sensed.

At the step S15, the frame, which contains the ID signal as described above and signals representative of the sensed inflation pressure of the tire and temperature of air in the tire, is sent out through the antenna 23a of the controller 23. In addition, the transmission time is recorded for the next transmission.

Through performing the above process, each of the transceivers 2 of the tire inflation pressure sensing apparatus S1 sends out the frame only when it rotates in the possible range for reception.

Accordingly, in this embodiment, the antenna 3a of the ECU 3 is installed at a suitable position on the body 7 of the vehicle 1 such that the ECU 3 can accurately recognize all the signals contained in the frames, each of which has been sent out by the corresponding transceiver 2 only from the possible range for reception.

Upon receiving the frames sent out from the transceivers 2, the ECU 3 identifies for each of the frames the corresponding wheel based on the ID signal contained in the frame and determines the inflation pressure of the corresponding tire based on the other signals contained in the frame. Then, the ECU 3 compares each of the determined inflation pressures of the tires with the predefined threshold value and outputs a warning signal to the warning device 5 when it is lower than the predefined threshold value.

The warning device 5 informs the driver of the vehicle 1 of the decrease in the inflation pressure of the tire upon receiving the warning signal from the ECU 3.

To sum up, in the tire inflation pressure sensing apparatus S1 according to the present embodiment, each of the transceivers 2 is configured to receive a predetermined radio wave (i.e., the predetermined AC signal) sent out from a corresponding one of the transmitters 4 and send out the frame containing signals representative of the sensing results when a transmission of the frame is required and a level of the received predetermined radio wave has reached a predetermined level.

As described previously, according to the first conventional approach, the antenna 3a of the ECU 3 is required to be installed at such a position on the body 7 of the vehicle 1 that the ECU 3 can accurately recognize all the signals contained in frames sent out by the transceivers 2 at any angular positions thereof.

In comparison, according to the present embodiment, the antenna 3a of the ECU 3 is required to be installed at such a position on the body 7 of the vehicle 1 that the ECU 3 can accurately recognize all the signals contained in the frames, each of which has been sent out by the corresponding transceiver 2 at only those angular positions that fall in the possible range for reception.

Accordingly, it becomes possible to determine a suitable installation position of the antenna 3a of the ECU 3 on the vehicle body 7 with more flexibility and less time effort.

Further, with the increased flexibility, it becomes possible to install the antenna 3a of the ECU 3 at an optimal position on the vehicle body 7, so that the antenna 3a has the highest sensitivity to the signals sent out from the transceivers 2.

As a result, the ECU 3 can accurately recognize all the signals contained in the frames sent out from the transceivers 2, regardless of rotation of the transceivers 2 together with wheels. Furthermore, the ECU 3 can accurately recognize all the signals sent out from the transceivers 2 without transmission of more than one frame that contain the same signals, thus saving the electrical power consumed by the transceivers 2.

Second Embodiment

In this embodiment, a tire inflation pressure sensing apparatus S2 is provided which has a configuration almost identical to that of the tire inflation pressure sensing apparatus S1 according to the previous embodiment. Accordingly, only the difference in configuration between the tire inflation pressure sensing apparatuses S1 and S2 is to be described below.

As described previously, in the tire inflation pressure sensing apparatus S1, each of the four transceivers 2 includes a battery 24 and is supplied with electrical power by the battery 24. Moreover, the ECU 3 is equipped with an antenna 3a and functions as a receiver to receive the frames sent out from the transceivers 2 through the antenna 3a. Furthermore, each of the four transmitters 4 is configured to send out the predetermined AC signal.

In comparison, in the tire inflation pressure sensing apparatus S2, each of the four transceivers 2 is supplied with electrical power without any battery. Moreover, the ECU 3 does not function as a receiver to receive the frames sent out from the transceivers 2. Furthermore, instead of the four transmitters 4, four transceivers 4 are provided each of which is configured to send out the predetermined AC signal and receive the frame sent out from a corresponding one of the transceivers 2.

In this embodiment, for the sake of avoiding unnecessary confusion, the transceivers 2 and the transceivers 4 will be referred to as the first transceivers 2 and the second transceivers 4 hereinafter.

Figure 8:
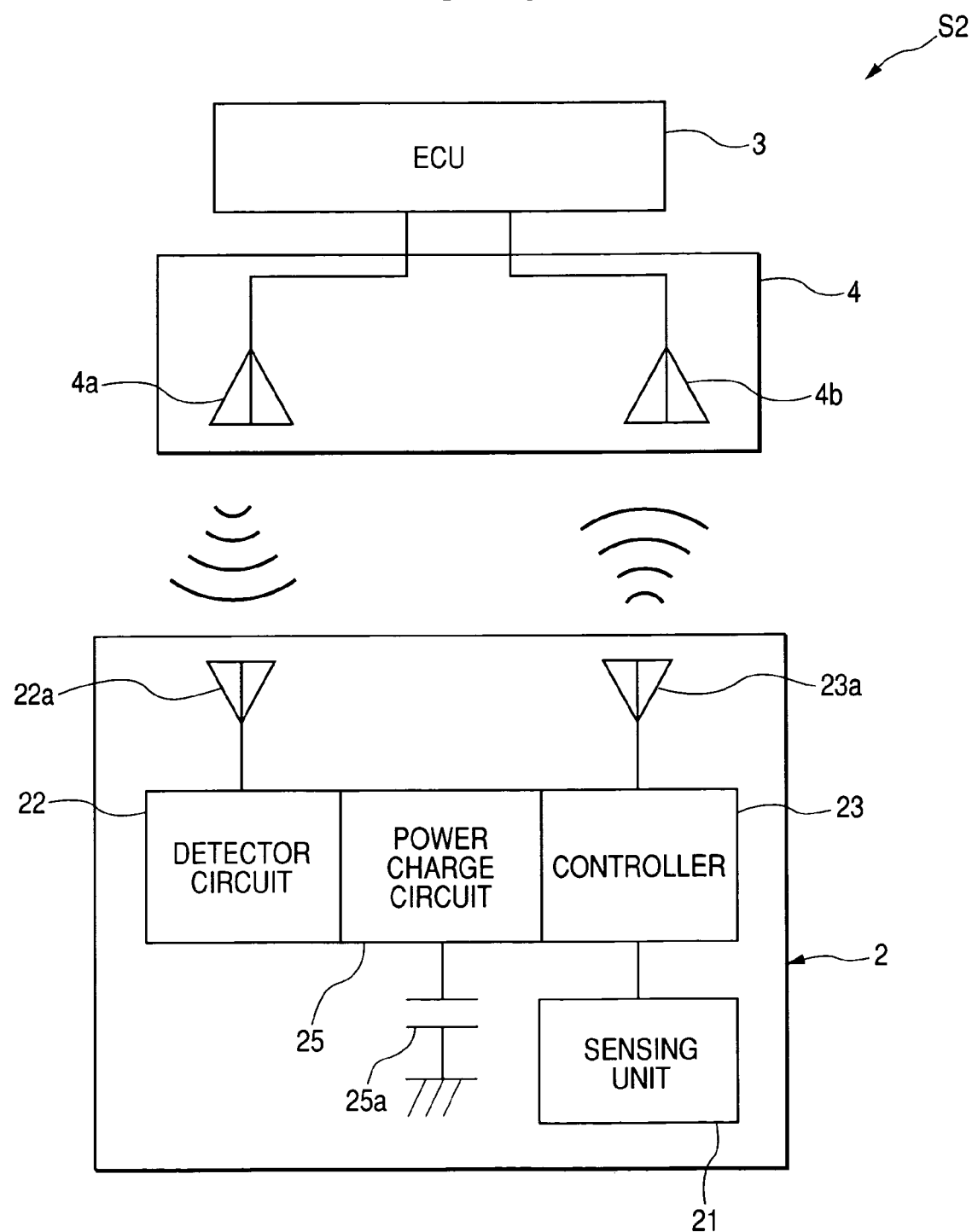
FIG. 8 is a block diagram showing the overall configuration of a first and a second transceiver of a tire inflation pressure sensing apparatus according to the second embodiment of the invention.

FIG. 8 shows the overall configuration of one of the first transceivers 2, a corresponding one of the second transceivers 4, and the ECU 3 in the tire inflation pressure sensing apparatus S2.

As shown in FIG. 8, each first transceiver 2 includes an electrical power charge circuit 25, instead of a battery 24 as in FIG. 2. Each second transceiver 4 includes a first antenna 4a, through which it sends out the predetermined AC signal, and a second antenna 4b through which it receives the frame sent out from the corresponding first transceiver 2.

In this embodiment, the predetermined AC signal sent out from the second transceivers 4 is utilized to induce electrical power in the charging circuits 25 of the first transceivers 2 as well as to determine angular positions of the first transceivers 2. In this case, the electrical power available for the first transceivers 2 is considerably smaller than in the case of supplying electrical power by a battery.

Accordingly, in this embodiment, the frames are sent out from the first transceivers 2 to the second transceivers 4 at a frequency within the low frequency band, instead of the ultra high frequency band, so that the frames can be sent out with the smaller electrical power.

Additionally, in this embodiment, the frequency for sending out the predetermined AC signal from the second transceivers 4 to the first transceivers 2 and that for sending out the frames from the first transceivers 2 to the second transceivers 4 have different values within the same law frequency band.

Figure 9:
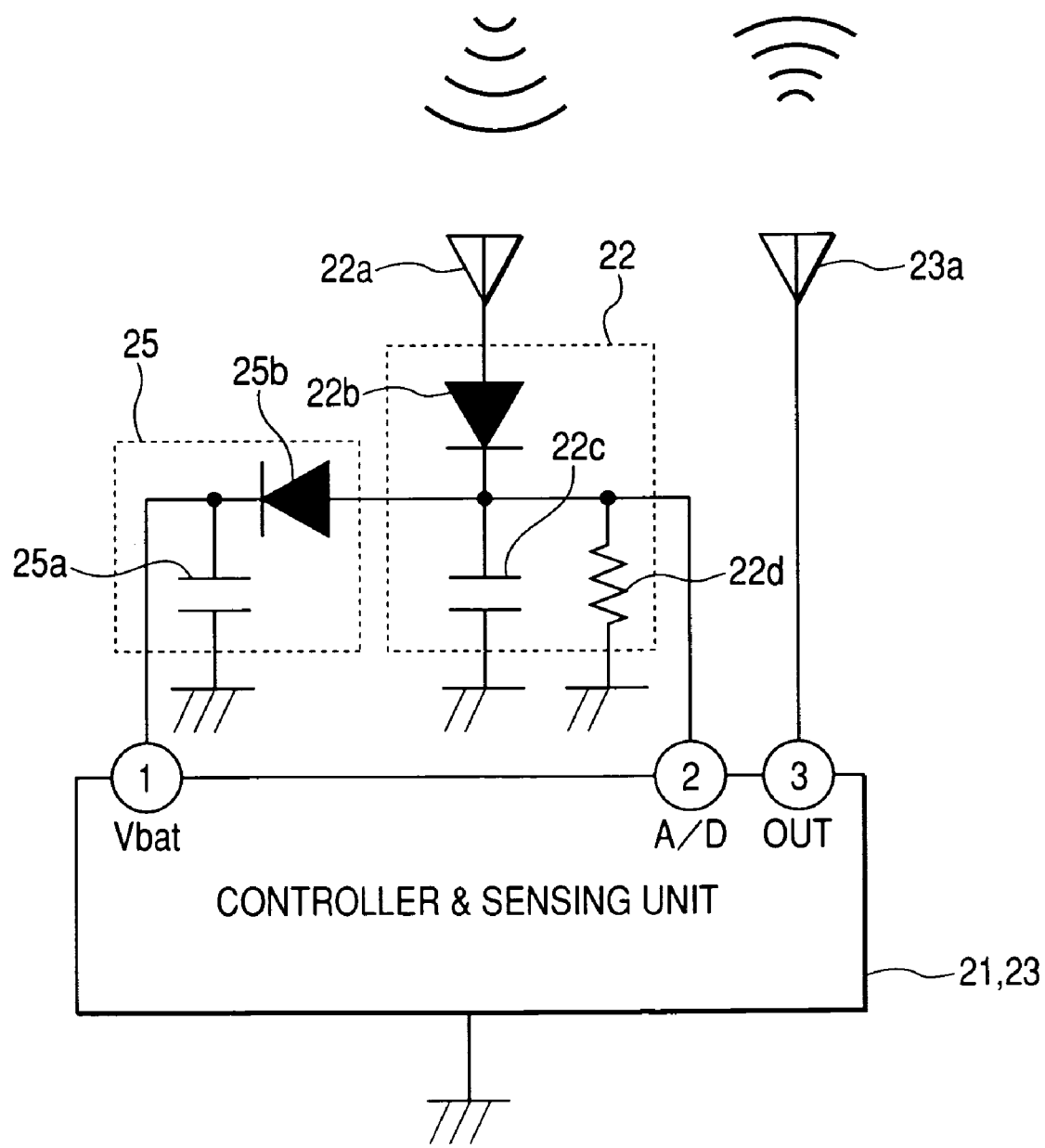
FIG. 9 is a circuit diagram showing the overall configuration of a detector circuit and an electrical power charge circuit of the first transceiver of FIG. 8.

FIG. 9 shows the configuration of the detector circuit 22 and electrical power charge circuit 25 of one of the first transceivers 2 of the tire inflation pressure sensing apparatus S2. As shown in the figure, the electrical power charge circuit 25 includes a capacitor 25a and a diode 25b.

The predetermined AC signal sent out from the corresponding second transceiver 4 is received and converted to the corresponding DC signal through the detector circuit 22. The corresponding DC signal then induces electrical charge to be stored in the capacitor 25a of the electrical power charge circuit 25. The controller 23 of the first transceiver 2 monitors the voltage across the capacitor 25a (to be referred to as charge voltage Vbat hereinafter).

Figure 10A:
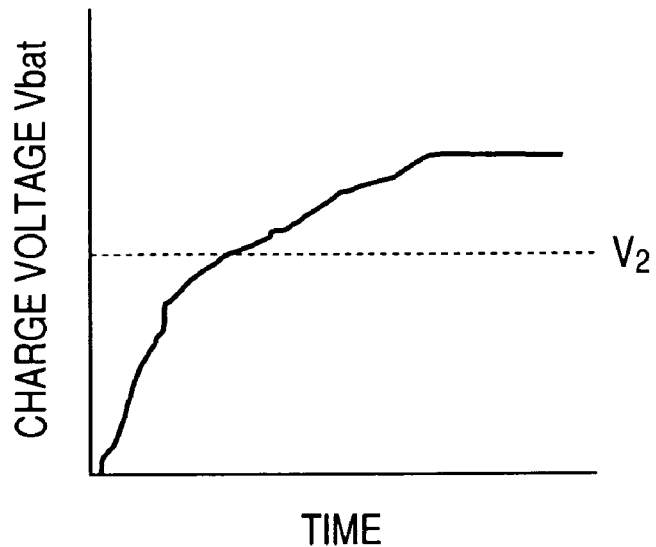
FIG. 10A is a characteristic diagram showing the voltage of a DC signal that is outputted from the detector circuit of FIG. 9.
Figure 11:
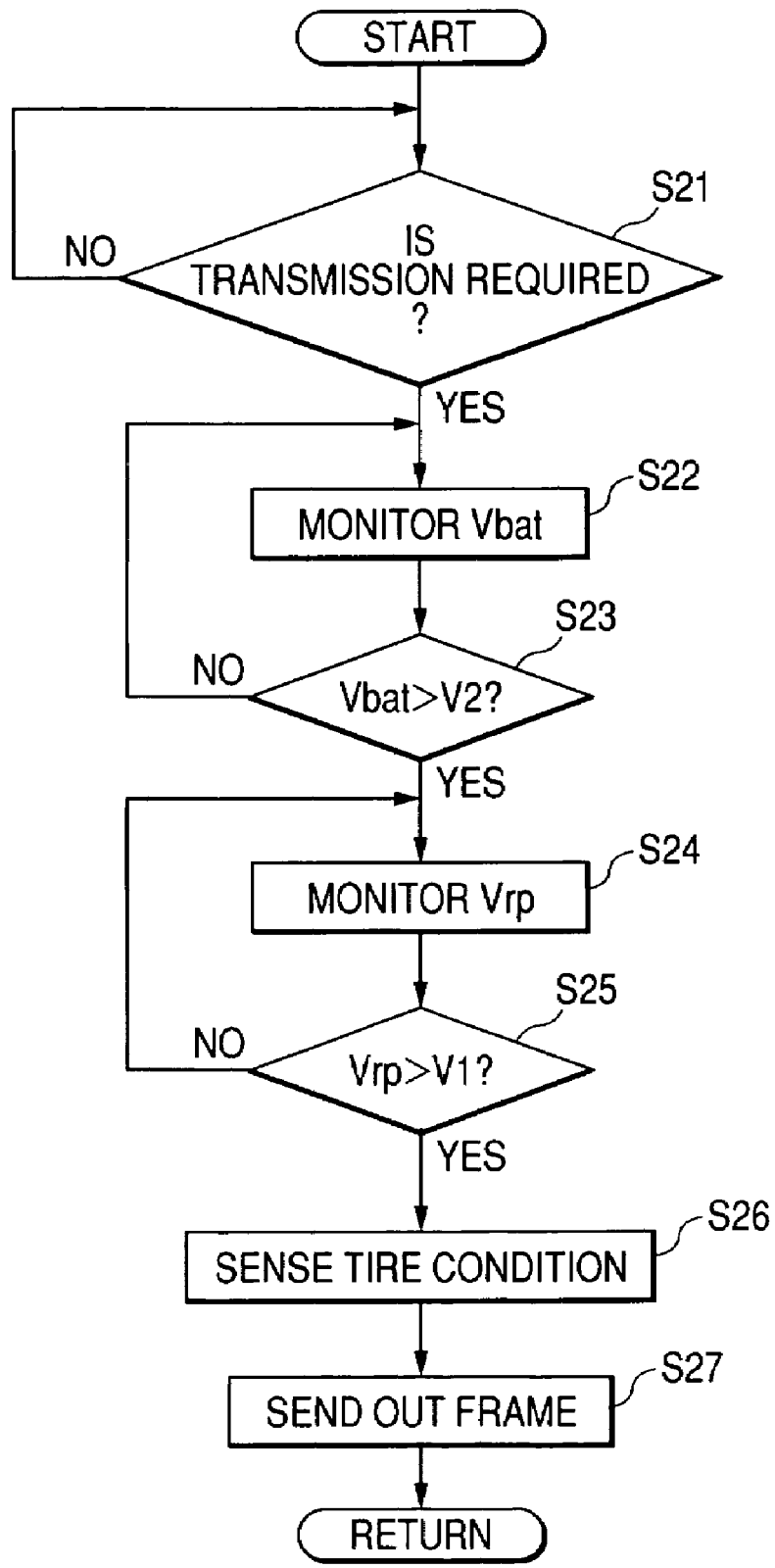
FIG. 11 is a flow chart showing a process performed by the first transceiver of FIG. 8 for sending out a frame containing signals.

FIG. 10A shows the charge voltage Vbat and FIG. 11 shows the voltage Vrp of the corresponding DC signal received by the controller 23. As shown in the figures, the charge voltage Vbat increases with time and the voltage Vrp varies with angular position of the first transceiver 2.

In this embodiment, the controller 23 determines a transmission time for sending out the frame from the first transceiver 2 to the corresponding second transceiver 4 through checking whether all the following three conditions are satisfied.

The first condition is that the time period from the previous transmission time to the present moment is longer than a given time period, for example, of 1 minute. When this condition is satisfied, the controller 23 recognizes that it is time to start new transmission, in other words, that a new transmission is required.

The second condition is that the charge voltage Vbat has increased above a necessary charge voltage V2, which is required for the first transceiver 2 to complete one transmission of the frame. Additionally, the necessary charge voltage V2 may be previously determined and stored in the ROM or RAM of the controller 23.

The third condition is that the voltage Vrp has increased above the predetermined value V1, in other words, the first transceiver 2 has rotated into the possible range for reception. Additionally, the predetermined value V1 may also be previously stored in the ROM or RAM of the controller 23.

FIG. 11 shows a process for sending out the frame from the first transceiver 2 to the corresponding second transceiver 4 according to the present embodiment, which is performed by the controller 23 of the first transceiver 2.

Specifically, at the step S21, a first determination is made as to whether a new transmission is required. If it is, the process proceeds to the step S22; else, the process returns to the START thereof.

At the step S22, the charge voltage Vbat is monitored.

At the step S23, a second determination is made as to whether the charge voltage Vbat has increased above the necessary charge voltage V2. If it has been, the process proceeds to the step S24; else the process returns to the step S22 to repeat monitoring the charge voltage Vbat.

At the step S24, the voltage Vrp of the corresponding DC signal, which is provided from the detector circuit 22 to the controller 23, is monitored.

At the step S25, a third determination is made as to whether the voltage Vrp of the corresponding DC signal has increased above the predetermined value V1. If it has been, the process proceeds to the step S26; else the process returns to the step S24 to repeat monitoring the voltage Vrp.

At the step S26, the inflation pressure of the tire and the temperature of air in the tire are sensed.

At the step S27, the frame, which contains the ID signal as described above and signals representative of the sensed inflation pressure of the tire and temperature of air in the tire, is sent out through the antenna 23a of the controller 23. In addition, the transmission time is recorded for the next transmission.

Through performing the above process, each of the first transceivers 2 of the tire inflation pressure sensing apparatus S2 sends out the frame only when it rotates in the possible range for reception.

As a result, with the above configuration of the tire inflation pressure sensing apparatus S2, it is possible to obtain those effects that are obtainable with the configuration of the tire inflation pressure sensing apparatus S1 according to the previous embodiment.

Moreover, with the above configuration of the tire inflation pressure sensing apparatus S2, each of the first transceivers 2 starts to send out the frame only when the charge voltage Vbat has increased above the necessary charge voltage V2, thereby ensuring sufficient electrical power for the transmission of the frame.

Further, as described previously, in the case of supplying electrical power via a radio wave, the electrical power available for the first transceivers 2 is considerably smaller than in the case of supplying electrical power by a battery. Consequently, the level of signals sent out by the first transceivers 2 becomes considerably lower than that in the latter case. As a result, it becomes difficult for the ECU 3 to accurately recognize signals sent out from the first transceivers 2.

However, with the above configuration of the tire inflation pressure sensing apparatus S2, it is still possible for the ECU 3 to accurately recognize signals sent out from the first transceivers 2, since those signals have been sent out by the first transceivers 2 when they rotate in the respective possible ranges for reception.

Third Embodiment

In this embodiment, a method of sending out signals from the transceivers 2 of the tire inflation pressure sensing apparatus S1 or S2 is provided, which is different from that described in the previous embodiments.

In the previous embodiments, each of the transceivers 2 stores in a frame signals representative of the sensed inflation pressure of the tire and temperature of air in the tire together with an ID signal; then, it sends out the frame at once at a determined transmission time.

In comparison, according to the method of the present embodiment, each of the transceivers 2 stores the signals together with the ID signal in a frame that consists of a plurality of packets, and then sends out those packets separately at different determined transmission times.

Figure 12A:
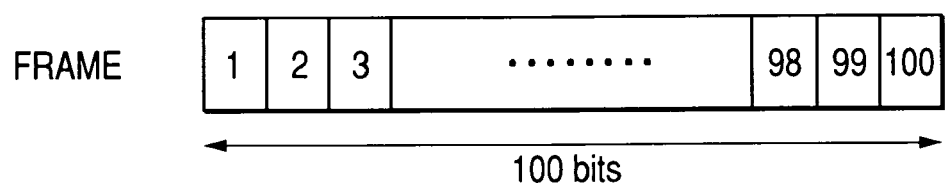
FIG. 12A is a schematic view illustrating a frame sent out by a transceiver of FIG. 2 of a first transceiver of FIG. 8.
Figure 12B:
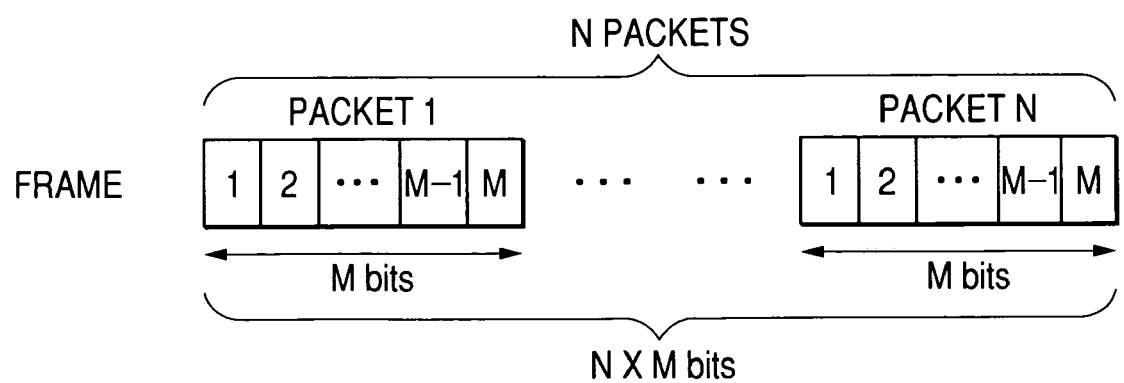
FIG. 12B is a schematic view illustrating a frame that consists of a plurality of packets according to the third embodiment of the invention.
Figure 13:
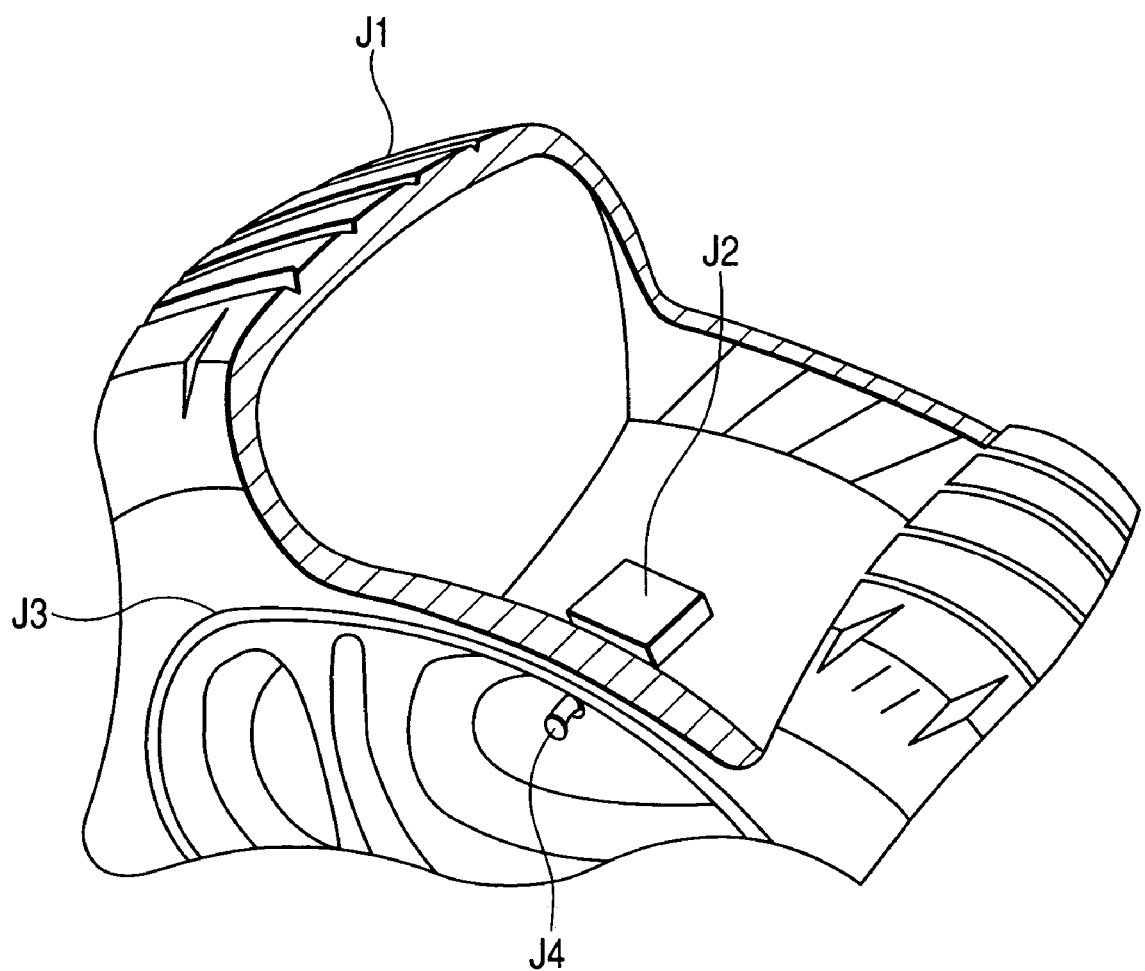
FIG. 13 is a schematic view illustrating the installation of a transmitter or a transceiver of a tire inflation pressure sensing apparatus to a wheel of a vehicle.

To illustrate the difference between the two transmission methods, two frames that contain the same information are given in FIGS. 12A-12B.

FIG. 12A shows a frame that is composed, for example, of 100 bits of data. When assuming that the transmission speed is 10 kbps, the time required to send out the frame is then equal to 10 ms.

Figure 10B:
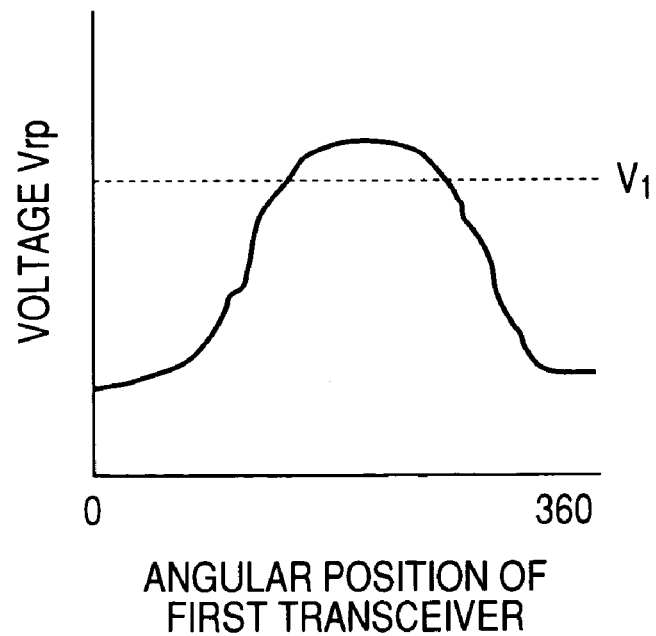
FIG. 10B is a characteristic diagram showing the voltage across the electrical power charge circuit of FIG. 9.

In comparison, FIG. 10B shows a frame that includes N packets each of which is composed of M bits of data. Since each packet includes a parity bit and a bit representative of the number of the packet, the total bits N×M of the frame becomes greater than 100 bits in the case of FIG. 10A.

When assuming that the transmission speed is also equal to 10 kbps, the time required to send out the frame is 0.1×M×N, which is longer than 10 ms in the case of FIG. 10A. However, for each of the packets, the time required to send out the single packet is only 0.1×M, which is shorter than 10 ms.

The method of the present embodiment can provide the following effect.

As running speed of the vehicle 1 increases, the rotational speed of the wheels 6a-6d also increases. As a result, the time period during which each of the transceivers 2 passes through the possible range for reception may become shorter than 10 ms that is required to send out the frame in FIG. 10A.

Consequently, when each of the transceivers 2 sends out the frame at once at a determined transmission time, the transceiver 2 will pass over the possible range for reception before completing sending out the frame, so that the ECU 3 cannot accurately recognize all the signals stored in the frame. In contrast, according to the method of the present embodiment, since the time required to send out each packet is made short, each of the transceivers 2 can complete sending out each packet before it passes over the possible range for reception. As a result, the ECU 3 can accurately recognize all the signals stored in the frame upon receiving all the packets of the frame that are separately sent out from the transceiver 2.

Other Embodiments

While the above particular embodiments of the invention have been shown and described, it will be understood by those who practice the invention and those skilled in the art that various modifications, changes, and improvements may be made to the invention without departing from the spirit of the disclosed concept.

For example, in the previous embodiments of the invention, the transmitters 4 (or transceivers 4) are configured to constantly send out the predetermined AC signal.

However, they may also be configured to send out the predetermined AC signal only when information about the condition of the tires is required. In this case, each of the transceivers 2 may be configured to start the task of sensing the inflation pressure of the tire and the temperature of air in the tire and sending out the frame containing signals representative of the sensing results upon receiving the predetermined AC signal sent out from the corresponding one of the transmitters 4 (or transceivers 4).

Moreover, each of the transceivers 2 may also be configured to operate in two different modes. In the first mode, each transceiver 2 performs the task of sensing and sending out the frame at predetermined intervals, for example, of 1 minute, without receiving the predetermined AC signal. In the second mode, upon receiving the predetermined AC signal, each transceiver 2 performs the task of sensing and sending out the frame in accordance with one of the processes of the previous embodiments.

Further, in the previous embodiments of the invention, the transceivers 2 are configured to be supplied with electrical power by a battery or a radio wave (i.e., the predetermined AC signal).

However, without being limited to the above two ways, each of the transceivers 2 may also be configured to include an electrical power generating unit, which generates electrical power using a centrifugal force due to rotation of the wheel, and be supplied with electrical power by the electrical power generating unit.

Furthermore, in the previous embodiments of the invention, each of the transceivers 2 is configured to send out the frame when the voltage Vrp of the corresponding DC signal has increased above the predetermined value V1.

However, each of the transceivers 2 may also be configured to send out the frame when the voltage Vrp of the corresponding DC signal has reached a maximum value Vmax. In this case, the maximum value Vmax may be previously determined and stored in the ROM or RAM of the controller 23 of the transceiver 2. Otherwise, the controller 23 of the transceiver 2 may be configured to determine, when the rate of change of the monitored voltage Vrp becomes zero, that the voltage Vrp has reached the maximum value Vmax.

Such modifications, changes, and improvements within the skill of the art are intended to be covered by the appended claims.

What is claimed is:

1. A tire inflation pressure sensing apparatus comprising:
   a pressure sensor provided on a wheel of a vehicle, said pressure sensor working to sense an inflation pressure of a tire mounted on the wheel and generate a pressure signal representative of the sensed inflation pressure of the tire;
   a transmitter provided on a body of the vehicle, said transmitter being configured to constantly send out a predetermined radio wave;
   a transceiver provided on the wheel of the vehicle, said transceiver being configured to receive the predetermined radio wave sent out from said transmitter, monitor a level of the received predetermined radio wave, and send out the pressure signal generated by said pressure sensor when a transmission of the pressure signal is required and the level of the received predetermined radio wave has reached a predetermined level;
   a receiver provided on the body of the vehicle, said receiver being configured to receive the pressure signal sent out from said transceiver; and
   a determining device provided on the body of the vehicle, said determining device being configured to determine the inflation pressure of the tire based on the pressure signal received via said receiver.

2. The tire inflation pressure sensing apparatus as set forth in claim 1, wherein said transceiver is configured to send out the pressure signal generated by said pressure sensor when a transmission of the pressure signal is required and a voltage of the received predetermined radio wave has increased above a predetermined value.

3. The tire inflation pressure sensing apparatus as set forth in claim 1, wherein said transceiver is configured to send out the pressure signal generated by said pressure sensor when a transmission of the pressure signal is required and a voltage of the received predetermined radio wave has reached a maximum value.

4. The tire inflation pressure sensing apparatus as set forth in claim 1, wherein said pressure sensor and said transceiver are supplied with electrical power via the predetermined radio wave.

5. The tire inflation pressure sensing apparatus as set forth in claim 4, further comprising a charging unit that is provided on the wheel of the vehicle and configured to store therein an electrical power, which is induced by the predetermined radio wave received via said transceiver, and supply the electrical power to said pressure sensor and said transceiver,
   wherein said transceiver is configured to send out the pressure signal generated by said pressure sensor when a transmission of the pressure signal is required, the level of the received predetermined radio wave has reached the predetermined level, and a voltage across said charging unit has increased above a predetermined value.

6. The tire inflation pressure sensing apparatus as set forth in claim 4, wherein the predetermined radio wave and the pressure signal are sent out at different frequencies within a same low frequency band.

7. The tire inflation pressure sensing apparatus as set forth in claim 1, wherein said transceiver is configured to store the pressure signal generated by said pressure sensor in a frame that consists of a plurality of packets and send out those packets separately at different times when a transmission of the pressure signal is required and the level of the received predetermined radio wave has reached the predetermined level.

8. The tire inflation pressure sensing apparatus as set forth in claim 1, wherein said transmitter and said receiver are integrated into a transceiver that is configured to send out the predetermined radio wave and receive the pressure signal sent out from said transceiver.

9. A tire inflation pressure sensing apparatus comprising:
   a plurality of pressure sensors each of which is provided on one of a plurality of wheels of a vehicle, each of said pressure sensors working to sense an inflation pressure of a tire mounted on a corresponding one of the wheels and generate a pressure signal representative of the sensed inflation pressure of the tire;
   a plurality of transmitters each of which is provided on a body of the vehicle away from a corresponding one of the wheels by a given distance, each of said transmitters being configured to constantly send out a predetermined radio wave;
   a plurality of transceivers each of which is provided on one of the wheels of the vehicle, each of said transceivers being configured to receive the predetermined radio wave sent out from a corresponding one of said transmitters, monitor a level of the received predetermined radio wave, and send out the pressure signal generated by a corresponding one of said pressure sensors when a transmission of the pressure signal is required and the level of the received predetermined radio wave has reached a predetermined level;
   a receiver provided on the body of the vehicle, said receiver being configured to receive the pressure signals sent out from said transceivers; and
   a determining device provided on the body of the vehicle, said determining device being configured to determine the inflation pressures of the tires based on the pressure signals received via said receiver.

10. The tire inflation pressure sensing apparatus as set forth in claim 9, wherein each of said transceivers is configured to send out the pressure signal generated by the corresponding one of said pressure sensors when a transmission of the pressure signal is required and a voltage of the received predetermined radio wave has increased above a predetermined value.

11. The tire inflation pressure sensing apparatus as set forth in claim 9, wherein each of said transceivers is configured to send out the pressure signal generated by the corresponding one of said pressure sensors when a transmission of the pressure signal is required and a voltage of the received predetermined radio wave has reached a maximum value.

12. The tire inflation pressure sensing apparatus as set forth in claim 9, wherein each of said transceivers is configured to store the pressure signal generated by the corresponding one of said pressure sensors in a frame that consists of a plurality of packets and send out those packets separately at different times when a transmission of the pressure signal is required and the level of the received predetermined radio wave has reached the predetermined level.

13. A tire inflation pressure sensing apparatus comprising:
a plurality of pressure sensors each of which is provided on one of a plurality of wheels of a vehicle, each of said pressure sensors working to sense an inflation pressure of a tire mounted on a corresponding one of the wheels and generate a pressure signal representative of the sensed inflation pressure of the tire;
a plurality of first transceivers each of which is provided on one of the wheels of the vehicle, each of said first transceivers being configured to receive a predetermined radio wave, monitor a level of the received predetermined radio wave, and send out the pressure signal generated by a corresponding one of said pressure sensors when a transmission of the pressure signal is required and the level of the received predetermined radio wave has reached a predetermined level;
a plurality of second transceivers each of which is provided on a body of the vehicle away from a corresponding one of said first transceivers by a given distance, each of said second transceivers being configured to constantly send out the predetermined radio wave and receive the pressure signal sent out from the corresponding one of said first transceivers; and
a determining device provided on the body of the vehicle, said determining device being configured to determine the inflation pressures of the tires based on the pressure signals received via said second transceivers.

14. The tire inflation pressure sensing apparatus as set forth in claim 13, wherein each of said first transceivers is configured to send out the pressure signal generated by the corresponding one of said pressure sensors when a transmission of the pressure signal is required and a voltage of the received predetermined radio wave has increased above a predetermined value.

15. The tire inflation pressure sensing apparatus as set forth in claim 13, wherein each of said first transceivers is configured to send out the pressure signal generated by the corresponding one of said pressure sensors when a transmission of the pressure signal is required and a voltage of the received predetermined radio wave has reached a maximum value.

16. The tire inflation pressure sensing apparatus as set forth in claim 13, wherein said pressure sensors and said first transceivers are supplied with electrical power via the predetermined radio wave.

17. The tire inflation pressure sensing apparatus as set forth in claim 16, further comprising a plurality of charging units each of which is provided on one of the wheels of the vehicle and configured to store therein an electrical power, which is induced by the predetermined radio wave received via a corresponding one of said first transceivers, and supply the electrical power to a corresponding one of said pressure sensors and the corresponding one of said first transceivers,
wherein each of said first transceivers is configured to send out the pressure signal generated by the corresponding one of said pressure sensors when a transmission of the pressure signal is required, the level of the received predetermined radio wave has reached the predetermined level, and a voltage across a corresponding one of said charging units has increased above a predetermined value.

18. The tire inflation pressure sensing apparatus as set forth in claim 13, wherein the predetermined radio wave and the pressure signals are sent out at different frequencies within a same low frequency band.

19. The tire inflation pressure sensing apparatus as set forth in claim 13, wherein each of said first transceivers is configured to store the pressure signal generated by the corresponding one of said pressure sensors in a frame that consists of a plurality of packets and send out those packets separately at different times when a transmission of the pressure signal is required and the level of the received predetermined radio wave has reached the predetermined level.

* * * * *